(12) United States Patent
Shirai et al.

(10) Patent No.: US 6,484,087 B2
(45) Date of Patent: Nov. 19, 2002

(54) METHOD OF SELECTING A PRECEDING VEHICLE, A PRECEDING VEHICLE SELECTING APPARATUS, AND A RECORDING MEDIUM FOR SELECTING A PRECEDING VEHICLE

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/816,068

(22) Filed: Mar. 26, 2001

(65) Prior Publication Data
US 2001/0037165 A1 Nov. 1, 2001

(30) Foreign Application Priority Data
Mar. 30, 2000 (JP) ........................................ 2000-094577

(51) Int. Cl.⁷ .............................................. G01S 13/93
(52) U.S. Cl. ...................... 701/96; 701/301; 180/169; 340/435; 342/70
(58) Field of Search ......................... 701/96, 301, 223; 180/169; 340/435, 436, 903, 904; 342/70

(56) References Cited

U.S. PATENT DOCUMENTS

| 5,510,990 A | 4/1996 | Hibino et al. ............... 364/426 |
| 5,710,565 A | 1/1998 | Shirai et al. .................. 342/70 |
| 6,198,426 B1 | 3/2001 | Tamatsu et al. .............. 342/70 |
| 6,311,123 B1 * | 10/2001 | Nakamura et al. ............ 701/96 |

FOREIGN PATENT DOCUMENTS

| JP | 5-288847 | 11/1993 |
| JP | 6-176300 | 6/1994 |
| JP | 8-160133 | 6/1996 |
| JP | 8-279099 | 10/1996 |
| JP | 11-45398 | 2/1999 |
| JP | 2000-147103 | 5/2000 |

* cited by examiner

*Primary Examiner*—William A. Cuchlinski, Jr.
*Assistant Examiner*—Arthur D. Donnelly
(74) *Attorney, Agent, or Firm*—Law Offices of David G. Posz (57) ABSTRACT

The radius of the curvature of the lane on which a subject vehicle is traveling, is calculated in accordance with the turning condition of the subject vehicle and the velocity of the subject vehicle is obtained on the basis of the steering angle, and the yaw rate. An instantaneous probability of the same lane that the recognized object target exists on the same lane is calculated. In this operation, the instantaneous probability is compensated. That is, the road shape is recognized with delineator or the like. The instantaneous probability of the same lane is compensated on the basis of the recognized road shape. The probability of the same lane is calculated after a predetermined filtering process with the compensated instantaneous probability of the same lane. The preceding vehicle is selected on the basis of the probability of the same lane.

17 Claims, 8 Drawing Sheets

CONVERSION INTO STRAIGHT LANE RELATION

METHOD OF SELECTING A PRECEDING VEHICLE, A PRECEDING VEHICLE SELECTING APPARATUS, AND A RECORDING MEDIUM FOR SELECTING A PRECEDING VEHICLE

BACKGROUND OF THE INVENTION

1. Field of the Invention

This invention relates to a method of selecting a preceding vehicle, a preceding vehicle selecting apparatus, a recording medium for selecting a preceding vehicle.

2. Description of the Prior Art

A preceding vehicle selecting apparatus for emitting a transmission signal such as a light signal or a millimeter band radio wave signal over a predetermined angle range in front of a vehicle and detecting the reflection signal to recognize an obstacle around the vehicle, and selecting one from them as a preceding vehicle of the vehicle is known. Data regarding the preceding vehicle is used in an alarm apparatus for generating alarm regarding the preceding vehicle or an apparatus for controlling the vehicle velocity to maintain a predetermined distance from the preceding vehicle.

In this type of apparatuses, it is necessary to selecting the preceding vehicle traveling in front of a subject vehicle from the recognized objects. In selecting the preceding vehicle, it is general to use a steering angle sensor or a yaw rate sensor is used. For example, Japanese patent provisional publication No. 8-279099 discloses such a technique. In this technique, a parameter representing a probability of the preceding vehicle is used to prevent that the preceding vehicle is lost or an obstacle other than the preceding vehicle is erroneously recognized as the preceding vehicle. However, there is stile a possibility of erroneously recognizing a preceding vehicle if the subject vehicle is traveling on the straight line lane and the farther lane curves. In consideration of this problem, it is necessary to directly recognize the shape of the rode.

In this respect, there is a method of recognizing the road shape from delineators provided on the edges of the road as disclosed in Japanese Patent application provisional publication No. 5-288847. This technique is effective because of no cost up due to addition of no video sensor. However, if there is no delineator or the delineator cannot be detected due to dead angle by vehicles in front of the subject vehicle, there is the problem that the road shape cannot be detected.

Moreover, if remote delineators can be detected, the reliability of the preceding vehicle judgment is considered to be high. However, if only near delineators are detected or if other signboards other than the delineator are detected, there is the problem that the reliability of the preceding vehicle selection is low.

SUMMARY OF THE INVENTION

The aim of the present invention is to provide a superior method of selecting a preceding vehicle, a superior preceding vehicle selecting apparatus, and a superior recording medium for selecting a preceding vehicle.

Further, this invention aims to provide techniques of selecting of a proper preceding vehicle though the road shape cannot be recognized, as well as, to provide a higher accuracy preceding vehicle selection when the road shape can be recognized.

According to the present invention, a first aspect of the present invention provides a method of selecting one of recognized objects as a preceding vehicle of a subject vehicle, comprising the steps of: recognizing said objects in front of said subject vehicle; obtaining relative positions and relative velocities of said recognized objects; classifying said objects into stationary objects and moving objects on the basis of relative velocities of said objects to said subject vehicle; calculating a curvature of the lane on which said subject vehicle is traveling, on the basis of a turning condition and the velocity of said subject vehicle; calculating a probability that each of said moving objects travels on the same lane as said subject vehicle on the basis of said curvature and said relative position of each of said moving objects; recognizing a shape of the road, including the lane, in front of said subject vehicle, on the basis of distances to said stationary objects and angles of said stationary objects in the width direction of said subject vehicle and detecting a degree of recognizing said shape on the basis of said relative positions of said stationary objects and each of said moving objects; detecting a possibility that each of said moving objects exists on the same lane as said subject vehicle on the basis of the recognized shape of the road and said degree; calculating a compensation value for compensating said probability on the basis of the detected possibility; compensating said probability with said compensation value; and selecting one of said moving objects as the preceding vehicle on the basses of the compensated probability.

That is, the-same-lane probability that the object exists on the same lane on which said subject vehicle is traveling is calculated on the basis of the turning condition of said subject vehicle and the velocity of said subject vehicle and the relative position of the object. The calculated the-same-lane probability is compensated and then, the preceding vehicle is selected. The road shape in front of said subject vehicle is recognized on the basis of the distance from the object and the angle of the object in the width direction and a possibility that the object exits on the same lane as said subject vehicle is judged on the basis of the recognized road shape and the degree of recognition. The compensation value for compensating the-same-lane probability is calculated on the basis of the judging result. The-same-lane probability is compensated in accordance with the compensation value.

According to the present invention, a second aspect of the present invention provides a preceding vehicle selecting apparatus for a vehicle comprising: turning detection means for detecting a turning condition of said subject vehicle; curvature calculation means for calculating a curvature of the lane on which said subject vehicle is traveling, on the basis of the detected turning condition and a velocity of said vehicle; radar means for emitting a transmission signal within a predetermined angle range, in front of said vehicle, extending in a width direction of said vehicle and for detecting distances to objects reflecting said transmission signal and angles of said object in said width direction of on the basis of the reflected transmission signal; object recognizing means for obtaining relative positions and relative velocities of said objects to said vehicle on the basis of the distances and the angles in said width direction from said radar means and classifying said objects into stationary objects and moving objects on the basis of said relative velocities; the-same-lane probability calculation means for calculating a probability that each of said moving objects exists on the same lane as said subject vehicle, on the basis of the curvature from said curvature calculation means and the relative position of each of said moving objects from said object recognition means; road shape recognition means for extracting a part of said stationary objects which are effective for recognizing a shape of said road on the basis of said relative positions of said stationary objects, for recognizing said shape of said road in front of said subject vehicle on the basis of said relative positions of said extracted stationary objects, and for detecting a degree that said shape has been recognized in accordance with said relative positions of said stationary objects and each of said moving objects; the-same-lane judging means for judging the possibility that each of said moving objects exists on the same lane as said vehicle on the basis of said recognized road shape and said degree; compensation value calculation means for calculating a compensation value for compensating said probability of each of said moving objects on the basis of the judging result by said the-same-lane judging means; compensation means for compensating said probability from said the-same-lane probability calculation means with said compensation value for each of said moving objects; and preceding vehicle selection means for selecting the preceding vehicle of said vehicle from said moving objects on the basis of probabilities from said compensation means.

According to the present invention, a third aspect of the present invention provides a preceding vehicle selection apparatus based on the second aspect, wherein said the-same-lane judging means further judges whether said degree is such that said the-same-lane judging means will incorrectly judge the possibility in accordance with the recognized shape of said road, and when said the-same-lane judging means judges that said degree is such that the-same-lane judging means will incorrectly judge the possibility, said compensation value calculation means makes said compensation value zero.

According to the present invention, a fourth aspect of the present invention provides a preceding vehicle selection apparatus based on the second aspect, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said compensation value calculation means makes the absolute value of said compensation value for said one of said moving objects relatively small.

According to the present invention, a fifth aspect of the present invention provides a preceding vehicle selection apparatus based on the second aspect, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said compensation value calculation means makes the absolute value of said compensation value for said one of said moving objects relatively small in accordance with a relative distance of said recognized shape determined with relative positions of said part of said stationary objects.

According to the present invention, a sixth aspect of the present invention provides a preceding vehicle selection apparatus based on the second aspect, wherein said the-same-lane judging means further judges whether each of said moving object exists around one of edge of said road, and when said the-same-lane judging means judges that each of said moving object exists around one of edge of said road, said compensation value calculation means makes said compensation value relatively large in the negative direction.

According to the present invention, a seventh aspect of the present invention provides a preceding vehicle selection apparatus based on the second aspect, wherein said the-same-lane judging means judges the possibility that each of said moving objects exists on the same lane with reference to relations of said relative position of each of said moving objects and relative positions of said part of stationary objects.

According to the present invention, an eighth aspect of the present invention provides a preceding vehicle selection apparatus based on the second aspect, wherein said road shape reorganization means recognizes edges of said road, and said the-same-lane judging means judges the possibility that each of said moving objects exists on the same lane as said vehicle on the basis of each of said recognized edges and said degree, and judges a priority of said possibility on the basis of said degree every said recognized edge, and said compensation value calculation means calculates a compensation value for compensating said probability of each of said moving objects on the basis of the judging result of said the-same-lane judging means of which said priority judged for one of said recognized edges is higher than that for the other of said recognized edges.

According to the present invention, a ninth aspect of the present invention provides a preceding vehicle selection apparatus based on the eighth aspect, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said the-same-lane judging means judges said priority of said possibility to be relative low priority.

According to the present invention, a tenth aspect of the present invention provides a preceding vehicle selection apparatus based on the eighth aspect, wherein said the-same-lane judging means further judges whether each of said moving object exists around one of edge of said road, and when said the-same-lane judging means judges that each of said moving object exists around one of edges of said road, said the-same-lane judging means judges said priority to be relatively high.

According to the present invention, an eleventh aspect of the present invention provides a preceding vehicle selection apparatus based on the tenth aspect, wherein said the-same-lane judging means judges the priority that each of said moving objects exists on the same lane with reference to relations of said relative position of each of said moving objects and relative positions of said part of stationary objects.

According to the present invention, a twelfth aspect of the present invention provides a preceding vehicle selection apparatus based on the second aspect, wherein the-same-lane judging means detects a relative velocity vector of said part of stationary objects which are effective for recognizing a shape of said road, obtains a circle of which a tangent line vector corresponds to said relative velocity vector, and judges the possibility on the basis of said circle.

According to the present invention, a thirteenth aspect of the present invention provides a recoding medium readable by a computer for recording programs for a preceding vehicle selection apparatus for a vehicle comprising: turning detection means for detecting a turning condition of said subject vehicle; curvature calculation means for calculating a curvature of the lane on which said subject vehicle is traveling, on the basis of the detected turning condition and a velocity of said vehicle; radar means for emitting a transmission signal within a predetermined angle range, in front of said vehicle, extending in a width direction of said vehicle and detecting distances to objects reflecting said transmission signal and angles of said object in said width direction of on the basis of the reflected transmission signal; object recognizing means for obtaining relative positions and relative velocities of said objects to said vehicle on the basis of the distances and the angles in said width direction from said radar means and classifying said objects into stationary objects and moving objects on the basis of said relative velocities; the-same-lane probability calculation means for calculating a probability of existence of each of said moving objects on the same lane as said subject vehicle on the basis of the curvature from said curvature calculation means and the relative positions of each of said moving objects from said object recognition means; road shape recognition means for extracting a part of said stationary objects which are effective for recognizing a shape of said road on the basis of said relative positions of said stationary objects, recognizing a shape of said road on the basis of said relative positions of said extracted stationary objects, and detecting a degree that said shape has been recognized in accordance with said relative positions of said stationary objects and each of said moving objects; the-same-lane judging means for judging the possibility that each of said moving objects exists on the same lane as said vehicle on the basis of said recognized road shape and said degree; compensation value calculation means for calculating a compensation value for compensating said the-same-lane probability of each of said moving objects on the basis of the judging result by said the-same-lane judging means; compensation means for compensating said the-same-lane probability from said the-same-lane probability calculation means with said compensation value for each of said moving objects from said compensation value calculation means; and preceding vehicle selection means for selecting the preceding vehicle of said vehicle from said moving objects on the basis of the-same-lane probabilities from said compensation means.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

A vehicle control apparatus 1 including a preceding vehicle selecting apparatus according to an embodiment of the present invention will be described with reference to drawings.

The vehicle control apparatus 1 is mounted on a vehicle to alarm the driver when an obstacle exists at the alarming area or to control the velocity of a subject vehicle in accordance with the preceding vehicle.

Figure 1:
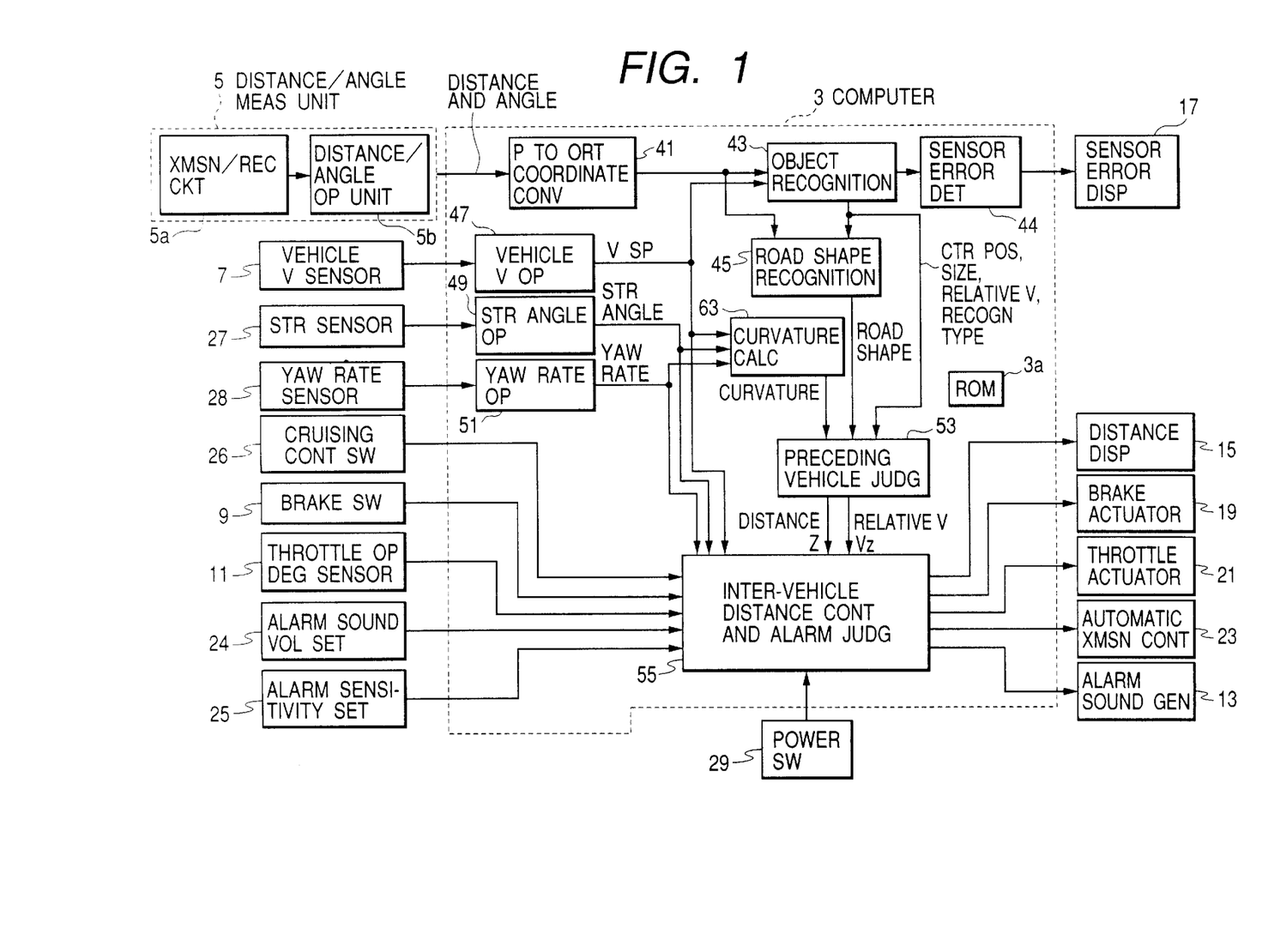
FIG. 1 is a block diagram of a vehicle control apparatus including a preceding vehicle selecting apparatus according to an embodiment of the present invention.

FIG. 1 is a block diagram of the vehicle control apparatus 1. The vehicle control apparatus 1 mainly includes a computer 3. The computer 3 includes a microprocessor, input/output interfaces, various driving circuits, various detection circuits, and a ROM 3a. These general structures are well known. Thus, the detailed description is omitted.

The computer 3 inputs various predetermined detection data from distance and angle measuring unit 5 for detecting an obstacle, a vehicle velocity sensor 7, a brake switch 9, and a throttle opening degree sensor 11.

Moreover, the computer 3 supplies predetermined driving signals to an alarm sound generating unit 13, a distance display 15, a sensor error display 17, a brake actuator 19, a throttle actuator 21, and an automatic transmission controller 23.

Further, the computer 3 includes an alarm sound volume setting unit 24 for setting a volume of alarm sound, an alarm sensitivity setting unit 25 for setting a sensitivity for alarm judging processing mentioned later, a cruising control switch 26, a steering sensor 27 for detecting an operation amount of steering wheels (not shown), and a yaw rate sensor 28. Moreover, the computer 3 includes a power switch 29 and starts its predetermined operations in accordance with the programs in the ROM 3a in response to turning on of the power switch 29.

The distance and angle measuring unit 5 includes a transmission and reception portion 5a and a distance and angle operation portion 5b. The transmission and reception portion 5a emits a laser beam in front of the vehicle over a predetermined angle range in the width direction around a predetermined optical axis to discontinuously scan the laser beam, and detects the reflection light. The distance and angle operation portion 5b operates the distance r to the object in front of the vehicle in accordance with the time interval to catch the reflection light. In addition to this laser type of distance and angle measuring unit, there are other types of distance and angle measuring units using a millimeter band radio wave or ultrasonic wave. Moreover, the scanning operation may be provided in various ways. For example, only the reception portion scans to receive the reflected light.

The computer 3 effects the alarm judging process for alarming the driver when an obstacle exists at the predetermined alarming area for a predetermined interval. The obstacles includes a preceding vehicle which is traveling in front of the subject vehicle, a stationary vehicle, and objects at the edges of the road such as a guard rail and its supporting members. Moreover, the computer 3 effects, in parallel, the inter-vehicle distance control for controlling the vehicle velocity in accordance with the condition of the preceding vehicle by supplying driving signals to the brake actuator 19, the throttle actuator 21, and the automatic transmission controller 23.

Next, respective blocks (programs) in the computer 3 will be described. The ROM 3a stores programs and data necessary for executing the programs. The programs are represented as blocks in the computer 3 in FIG. 1.

The data of distance r and scanning angle θ from the distance and angle operation portion 5b is supplied to the coordinate conversion block 41 for effacing conversion from polar coordinate to orthogonal coordinate. That is, the data is converted into data in the XZ orthogonal coordinate where origin (0, 0) corresponds to the center of the laser radar, X axis corresponds to the width direction, and Z axis corresponds to the front direction of the vehicle. The converted data is supplied to an object recognition block 43 and a road shape recognition block 45.

The object recognition block 43 obtains the center position (X, Z) and the size (W, D) of each object on the basis of the measured data converted into the orthogonal coordinate, and obtains a relative velocity (Vx, Vz) of each obstacle such as a preceding vehicle on the basis of the position of the subject vehicle in accordance with the variation of the center position (X, Z) of each object. Moreover, the object recognition block 43 obtains a type of the object indicating whether the object is a stationary object or a moving object, from the velocity V of the subject vehicle outputted by the vehicle velocity operation block 47 on the basis of the detection value of the vehicle velocity sensor 7 and the obtained relative velocity (Vx, Vz). The object that may affect traveling of the subject vehicle is selected in accordance with the recognized type and the center position of the object. Then, the distance is displayed on the distance display 15. Here, the size (W, D) of the object represents a width and a depth (length) of the object and this is referred to as an object model.

A sensor error detection block 44 detects whether the data obtained in the object recognition block 43 exists in the normal range. When the data exists in the abnormal range, the sensor error display 17 displays the condition.

On the other hand, the road shape recognition block 45 effects recognition of the road shape on the basis of the measured data converted into the orthogonal coordinate and the data obtained in the object recognition block 43. The recognition process of the road shape will be described later. The data obtained in the road shape recognition block 45 is supplied to a preceding vehicle judging block 53.

The steering angle operation block 49 obtains the steering angle on the basis of the signal from the steering sensor 27. The yaw rate operation block 51 operates the yaw rate on the basis of the signal from the yaw rate sensor 28.

The curvature calculation block 63 calculates a curvature on the basis of the vehicle velocity from the vehicle velocity operation block 47, the steering angle from the steering angle operation block 49, the yaw rate from the yaw rate operation block 51. The preceding vehicle judging block 53 selects the preceding vehicle on the basis of the curvature radius R, the recognized type obtained by the object recognition block 43, the center position coordinate (X, Z), the size (W, D) of the object, the relative velocity (Vx, Vz), and the road shape data obtained by the road shape recognition block 45, and obtains the distance Z and the relative velocity Vz of the perceiving vehicle.

The inter-vehicle distance control portion and alarm judging block 55 judges whether alarming is generated in the alarming judging process and determines the controlling in the inter-vehicle distance control in the cruising judging processing on the basis of the distance Z from the preceding vehicle, the relative velocity Vz to the preceding vehicle, the vehicle velocity of the subject vehicle Vn, acceleration of the preceding vehicle, the center position of the object, the width of the object, the recognized type, the setting condition of the cruise control switch 26, the depressing condition of the brake switch, the opening degree of the throttle opening degree sensor 11, and sensitivity setting value from the alarm sensitivity setting unit 25. If the alarming is necessary, the alarm signal is supplied to the alarm generator 13. In the cruising judgment, supplying control signals to the automatic transmission controller 23, the brake actuator 19, and the throttle actuator 21 performs a necessary controlling. During controlling, necessary display signal is supplied to the distance display 15 to inform the driver of the condition.

Next, recognition of road shape executed in the vehicle control apparatus 1 having the structure mentioned above will be described with reference to a flow chart shown in FIG. 2.

Figure 2:
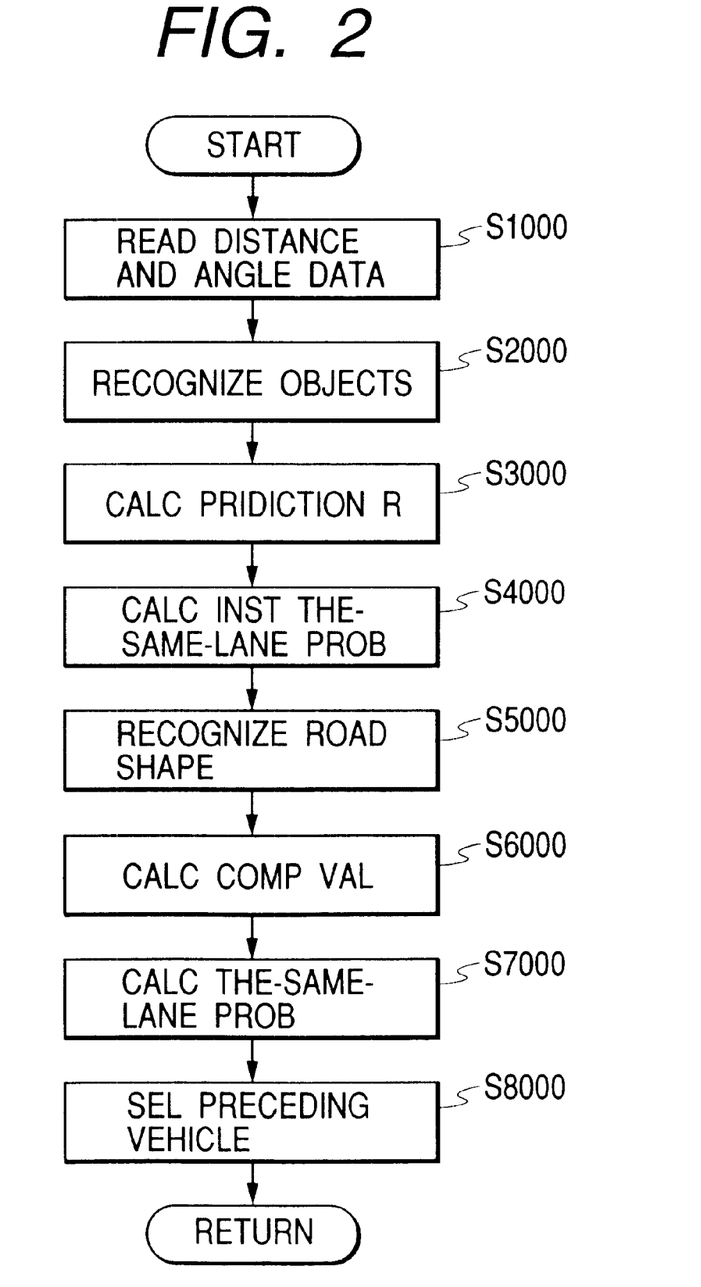
FIG. 2 depicts a flow chart showing a preceding vehicle selection operation according to the embodiment.

In the first step S1000 in FIG. 2 the computer 3 reads the distance and angle data obtained by one scanning in the distance and angle measuring unit 5. The scanning period is 100 msec and thus, data is read every 100 msec.

In the following step S2000, the polar to orthogonal coordinate conversion block 41 converts the measured distance and angle data into XZ orthogonal coordinate from the polar coordinate. On the basis of the converted data, the object recognition block 43 recognizes objects. This object recognition operation is effected on the basis of the relative position and relative velocity of each objects as mentioned above. The recognized object is referred to as a target object or a target object model.

In step S3000, the curvature calculation block 63 calculates the prediction R (the curvature radius of the lane on which the subject vehicle is traveling), on the basis of the yaw rate obtained from the yaw rate sensor 28 or the steering angle obtained from the steering sensor 27. Here, the prediction R is calculated from the steering angle as follows:

Prediction $R$=a constant÷the steering angle

The constant for obtaining the prediction R (curvature radius) from the steer angle in this equation is well known. Thus, the detailed description is omitted.

In step S4000, an instantaneous the-same-lane probability of the target object recognized in step S2000 is calculated. The-same-lane probability is a parameter of the probability that the target object travels on the same lane as the subject vehicle. The instantaneous the-same-lane probability is the value calculated on the basis of the instantaneous detection data.

Figure 3A:
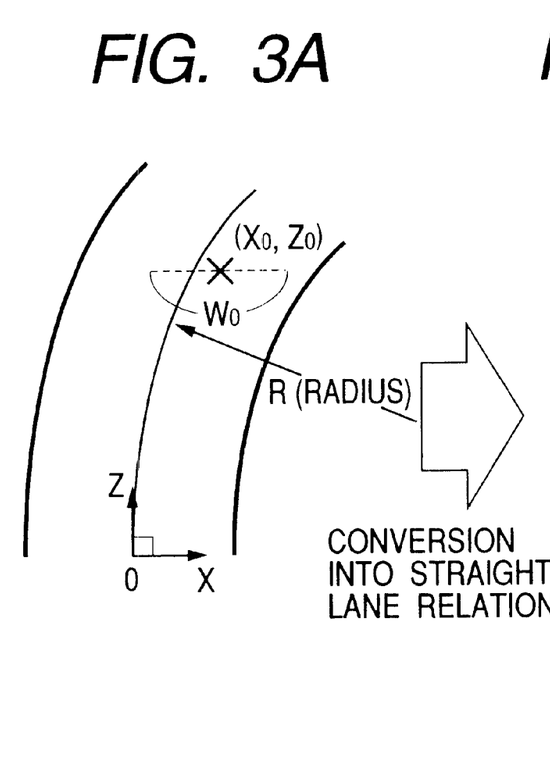
FIGS. 3A and 3B are illustrations a position converting operation according to the embodiment.
Figure 3B:
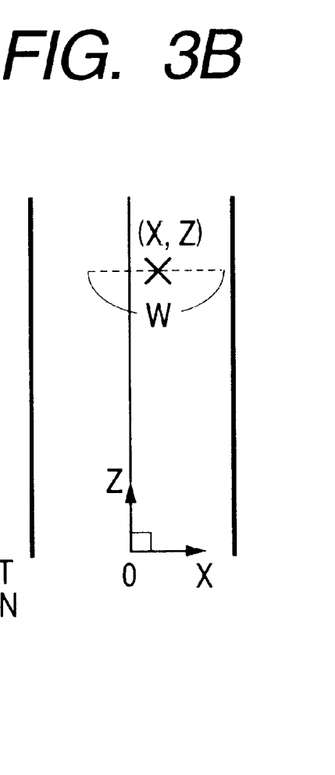

At first, the positions of target objects obtained in the object recognition process (S2000) are converted into positions on a straight line lane. It is assumed that the original center portion of a target object is (Xo, Zo) and the width in X axis is Wo. Then, the straight line lane conversion position (X, Z, W) is obtained (refer to FIG. 3).

$$X \leftarrow Xo - Zo^2/2R \quad (1)$$

$$Z \leftarrow Zo \quad (2)$$

$$W \leftarrow Wo \quad (3)$$

where R represents prediction R (curvature radius) and has a positive sign on a turn-to-right curve and has a negative sign on a turn-to-left curve.

In Eq. (1), "^" represents operation of power by the number following to "^", throughout the specification. Here, approximation is effected with assumption that the equation of a circle is $|X|<<|R|$, Z. Moreover if the distance and angle measuring unit 5 is mounted remote from the center of the vehicle, the Z coordinate is compensated such that the center of the vehicle agrees with the origin. That is, only X coordinate is converted.

Figure 4:
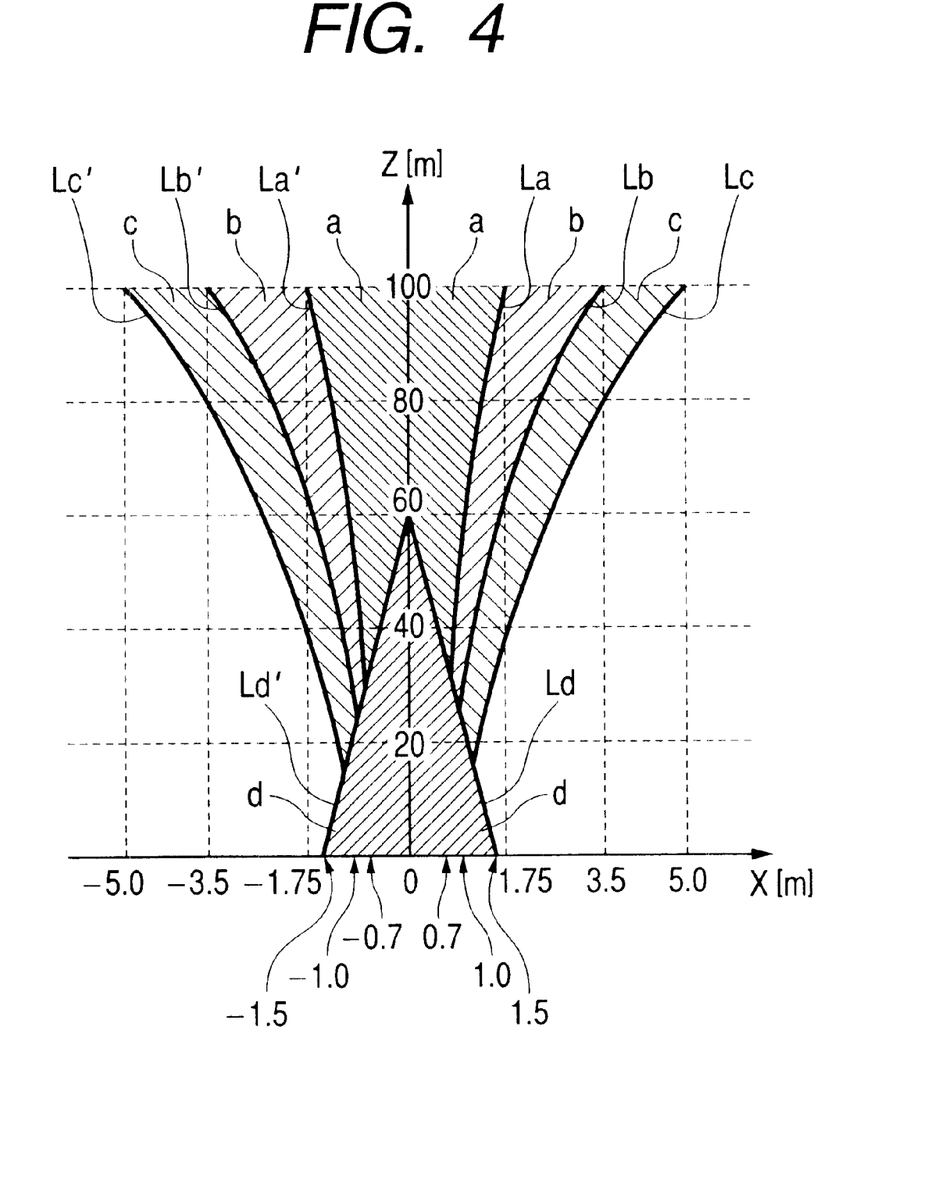
FIG. 4 is an illustration of the-same-lane probability map according to the embodiment.

The center position (X, Z) obtained by converting the position into the straight line lane is arranged on the probability on the-same-lane probability map shown in FIG. 4 to obtain the instantaneous probability on the same lane of each object, that is, the probabilities that the objects exist on the same lane as the subject vehicle are obtained. The reason why it is represented as a probability is that there may be error between the curvature radius R obtained from the steering angle and the actual curvature. To effect controlling with consideration of this error, instantaneous probabilities on the same lane of the respective objects are obtained.

In FIG. 4, the axis of abscissa represents X axis, that is, the right or left hand direction of the vehicle. The axis of ordinate represents Z axis, that is, the front direction of the subject vehicle. In this embodiment, this drawing indicates the range from the left 5m to the right 5 m and the range up to 100 m distance. The regions a represents the area where the probability on the same lane (the-same-lane probability) is 80%, the region b represents the are where the probability on the same lane is 60%, the region c is the area where the probability on the same lane is 30%, the region d represents the are of which the probability on the same lane is 100%, and other regions represents areas of which the probability on the same lane is 0%. The regions are experimentally obtained. Particularly, the region d is provided in consideration of cutting in just before the subject vehicle by another vehicle.

Boundaries La, Lb, Lc, and Ld for sectioning the areas a, b, c, and d are given by Eqs. (4) to (7)

$$La: X=0.7+(1.75-0.7)\cdot(Z/100)^2 \quad (4)$$

$$Lb: X=0.7+(3.55-0.7)\cdot(Z/100)^2 \quad (5)$$

$$Lc: X=1.0+(5.0-1.0)\cdot(Z/100)^2 \quad (6)$$

$$Ld: X=1.5\cdot(1-Z/60) \quad (7)$$

These are represented in the general equations as follows:

$$La: X=A1+B1\cdot(Z/C1)^2 \quad (8)$$

$$Lb: X=A2+B2\cdot(Z/C2)^2 \quad (9)$$

$$Lc: X=A3+B3\cdot(Z/C3)^2 \quad (10)$$

$$Ld: X=A4\cdot(B4-Z/C4) \quad (11)$$

From the equations (8) to (11), the regions satisfying the following equations (12) to (14) are set. The actual values are determined experimentally.

$$A1 \leq A2 \leq A3 < A4 \quad (12)$$

$$B1 \leq B2 \leq B3 \text{ and } B4=1 \quad (13)$$

$$C1=C2=C3 \text{ } (C4 \text{ is any value}) \quad (14)$$

The boundaries La, Lb, Lc, La', Lb', and Lc' in FIG. 4 are represented as parabolic curves in consideration of the calculation speed. However, it is better to represent them with circular arcs if the processing speed allows. Regarding the boundaries Ld and Ld' should be represented with outwardly expanding parabolic curves or circular arcs if the processing speed allows.

Next, the positions of respective target objects on the straight line lane are collated with the probability on the-same-lane map to provide the instantaneous probability on the same lane P0 is obtained as follows:

① object overlapping with the region d at any extent→P0=100%,

② object of which center exists within the region a→P0=80%,

③ object of which center exists within the region b→P0=60%,

④ object of which center exists within the region c→P0=30%, and

⑤ object not satisfying the above conditions→P0=0%.

In step S5000, the road shape recognition block 45 recognizes a road shape on the basis of target object data of delineators provided at edges of the road.

Figure 5A:
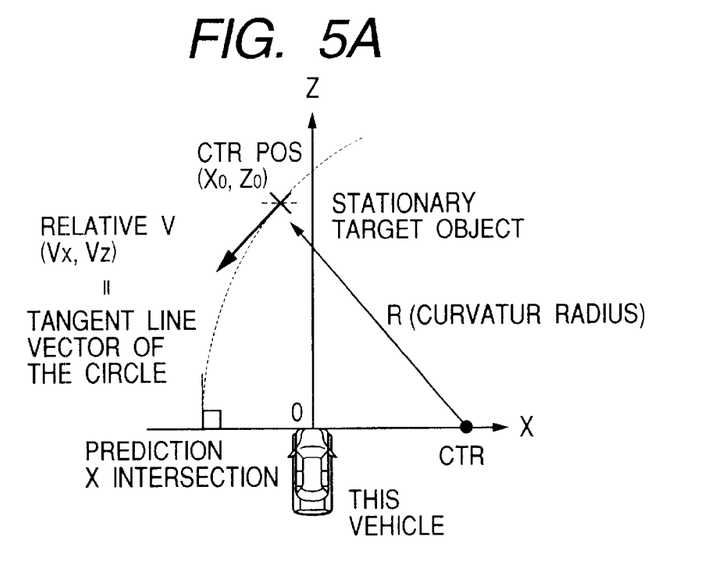
FIG. 5A is an illustration of a prediction intersection on X axis and FIG. 5B is an illustration of recognizing edges of road, according to the embodiment.

At first, the road shape recognition block 45 extracts objects of which widths are smaller than 1 m and the recognition type is stationary objects. This removes almost all of vehicles, guide boards, and signboards. The road shape recognition block 45 predicts X intersections of respective extracted stationary target objects. In calculating the prediction X intersections, a relative velocity vector at the center of each target object is obtained as shown in FIG. 5A. A circle including a tangent line vector corresponding to the relative velocity vector is obtained. It is assumed that the center of the circle exists on X axis, the circle orthogonally crosses X axis, so that the curvature radius R is uniquely obtained. In actual, approximation calculation is effected as follows:

It is assumed that $|X|<<|R|$, Z and a circle is subjected to the parabolic-approximation. The evaluation of the circle orthogonally crossing X axis is given by:

$$X=Xo+(Z-Zo)^2/2R \quad (15)$$

Moreover, because it is assumed that the relative velocity vector of the target object corresponds to a tangent line vector of the circle, the equation (15) is given by:

$$dX/dZ=Vx/Vz \quad (16)$$

From these two equations the curvature radius R is given by:

$$R=(Z-Zo)\cdot Vz/Vx$$

(refer FIG. 5A) and when Z=0, $$X=Xo-Zo\cdot Vz/2Vx$$

Then, the prediction X intersection is given by:

$$\text{prediction X intersection}=Xo-Zo\cdot Vx/2Vz$$

If prediction X intersections of all stationary target objects have been calculated, the following statistic processing is independently effected for negative and positive groups. At first, prediction X intersection of all stationary target objects are simply averaged as temporary mean value. Next, all data which are apart from the temporary means value by more than 2 m are neglected. The remaining data are subjected to averaging again. Here, the neglected data will not be used for recognition of the road shape.

The reason why the above-mentioned process is effected as follows:

If the data of a signboard upwardly arranged other than delineators is mixed in the data, the road shape will be erroneously recognized. Then, the above-mentioned averaging processing removes objects considerably remote from the position of the delineators, so that the road shape can be accurately recognized.

Figure 5B:
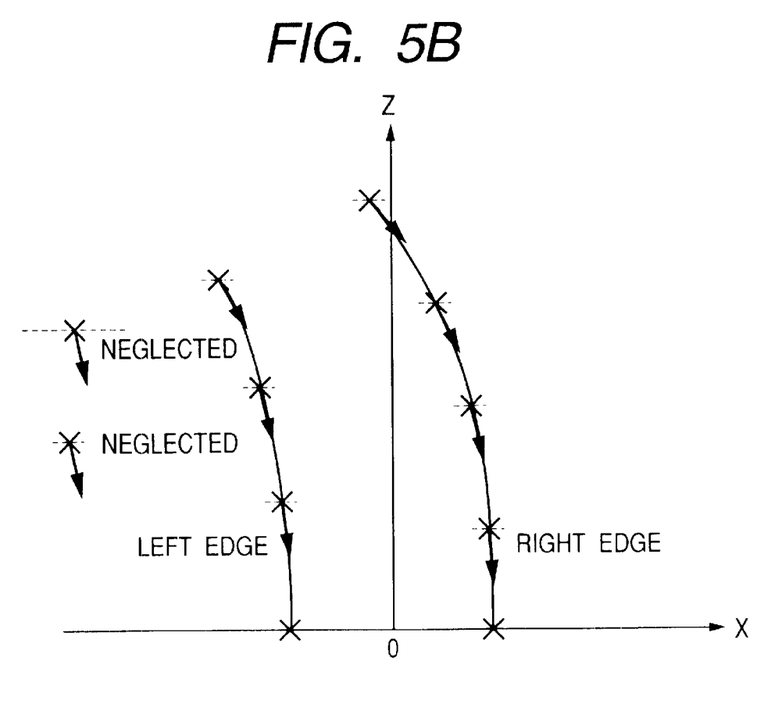

Next, the remaining target objects on the both edges (sides) of the road are joined together with interpolation, respectively. This provides edges of the road as shown in FIG. 5B. Here, the X intersections at the edge of the road are obtained by selecting target objects nearest to the X axis (Z is smallest) at both (right and left) edges of the road. Next, the prediction X intersections of these target objects are used as the X intersections of the edge of the road. The recognized edges of the road are set in a road edge coordinate table. There are right and left edge coordinate tables. Each stores X coordinate values of the edge of the road every distance of 5 m from 0 m to 150 m. More specifically, the distances of the target objects on the edges of the rod are rounded every five meters and are set in the tables. If there is no data, the section in the table remains empty.

In step S6000, the preceding vehicle judging block 53 judges whether respective target objects exist on the same lane as the subject vehicle on the road shape recognized in step S5000. Then, the preceding vehicle judging block 53 calculates the compensation value for the instantaneous probability of the same lane in accordance with the result.

At first, basic judgments are effected as to whether the vehicle exists on the same lane as the subject vehicle every target object.

The basic judgment includes the following three basic judgments.

[Basic Judgment 1]

Figure 6A:
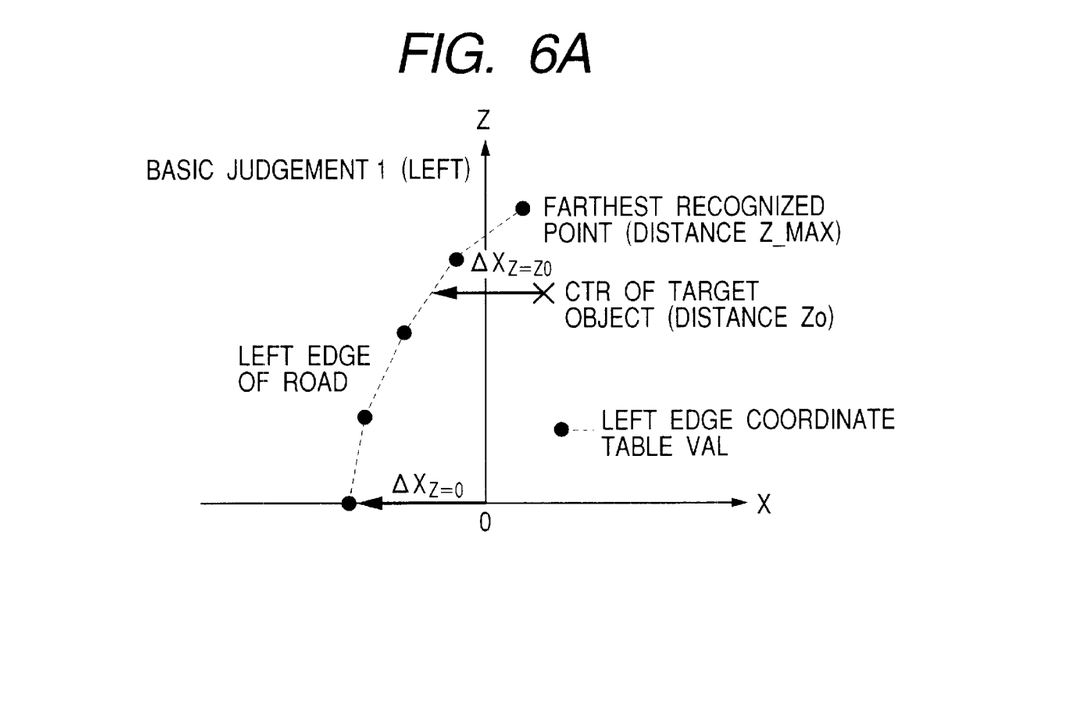
FIGS. 6A and 6B are illustrations of judging operations according to the embodiment.

This judgment is provided for the case that the road edges have been recognized beyond the target object as shown in FIG. 6A and is effected for the right and left edges, respectively.

(a) Left Edge of the Road

In FIG. 6A, when $Z\_MAX \geq Z_0$ and $|\Delta X_{Z=Zo} - \Delta X_{Z=0}| < 1.2$ m, the basic judgment 1 (L) result←1, when $Z\_MAX \geq Z_0$ and $|\Delta X_{Z=Zo} - \Delta X_{Z=0}| \geq 2.0$ m, the basic judgment 1 (L) result←−1, and in other cases, the basic judgment 1 (L) result←0, where (L) represents the left edge.

(b) Right Edge of the Road

In the same way as the right side, when $Z\_MAX \geq Z_0$ and $|\Delta X_{Z=Zo} - \Delta X_{Z=0}| < 1.2$ m, the basic judgment 1 (R) result←1, when $Z\_MAX\ Z_0$ and $|\Delta X_{Z=Zo} - \Delta X_{Z=0}| \geq 2.0$ m, the basic judgment 1 (R) result←−1, and in other cases, the basic judgment 1 (R) result ←0, where (R) represents the right edge.

When the result of the basic judgment 1 is "1", it is judged that the preceding vehicle exists on the same line as the subject vehicle, at a high probability. When the result of the basic judgment 1 is "−1", it can be judged the vehicle exists on the other lane or the target object is a portion of the road, at a high probability. The result "0" indicates that judgment is difficult or the case that the road edges cannot be recognized.

[Basic Judgement 2]

Figure 6B:
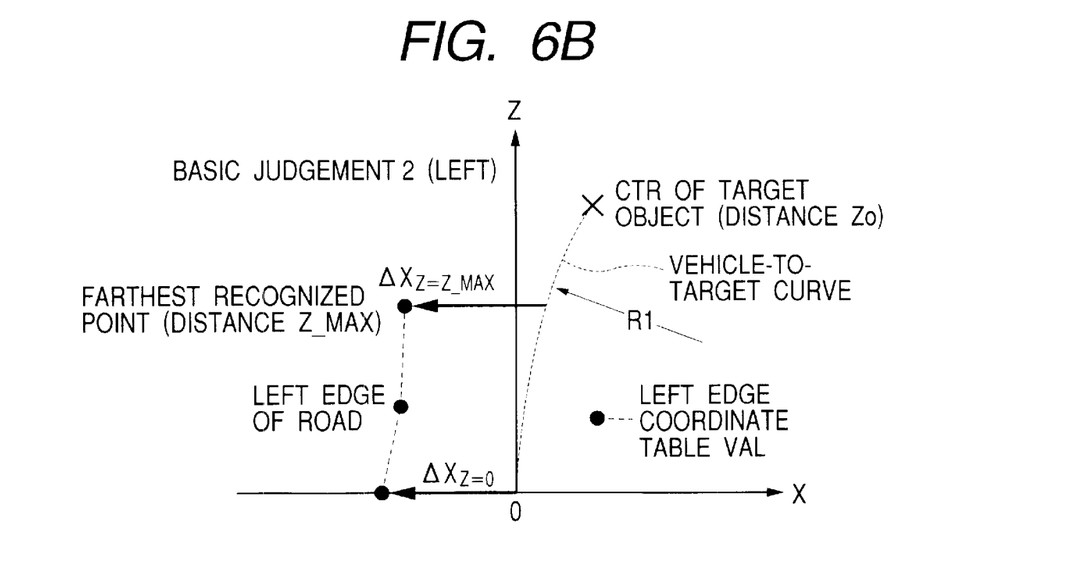

This judgment is provided for the case that the road edges cannot be recognized beyond the target object as shown in FIG. 6B, and is effected for both edges of the road.

(a) Left Edge of the Road

In FIG. 6B, when $|\Delta X_{Z=Z\_MAX} - \Delta X_{Z=0}| < 1.2$ m·$(Z\_MAX/Z_0)^2$, or $|\Delta X_{Z=Z\_MAX} - \Delta X_{Z=0}| < 0.3$ m, the basic judgment 2 (L) result←1, when $|\Delta X_{Z=Z\_MAX} - \Delta X_{Z=0}| \geq 2.0$ m·$(Z\_MAX/Z_0)^2$, and $|\Delta X_{Z=Z\_MAX} - \Delta X_{Z=0}| \geq 0.3$ m, the basic judgment 2 (L) result←−1, and in other cases, the basic judgment 1 (L)←0.

Here, when $Z\_MAX > Z_0/2$, the reliability of the second basic judgment 2 (L)←1 (high).

When $Z\_MAX \leq Z_0/2$, the reliability of the second basic judgment 2 (L)←−1 (low).

(b) Right Edge of the Road

The result of the basic judgment 2 (R) and the reliability of the basic judgment 2 (R) are calculated in the same way as the left edge of the road.

The vehicle-to-target curve in FIG. 6B is a circle arc between the target object and the origin which orthogonally intersects X axis. The equation of the circle of the circle arc is given by parabolic approximation with assumption of |X|<<|R1|, Z, with the following equation:

$$X = Z^2/R1,$$

where R1 is a radius of the circle.

Moreover, as shown in FIG. 6B, the distance ($\Delta X_{Z=Z\_Max}$) from the recognized farthest point (distance Z_MAX) to the vehicle-object target curve in the direction parallel to the X axis is used for judgment. The judgment values are given by multiplying the judgment values for 1.2 m and 2.0 m in the basic judgment 1 with $(Z\_MAX/Z_0)^2$ because the parabolic approximation is effected.

When the result of the basic judgment 2 is "1", the object target can be judged to be on the same lane as the subject vehicle at a high possibility. When the result of the basic judgment 2 is "−1", the object target can be judged to be on the other lane than the subject vehicle or to be object on the road at a high possibility. Moreover, in the basic judgment 2, the reliability of the judgment is represented in two ranks. When the judgment result or the judged reliability is "0", this indicates that judgment is difficult or that the edge of the road cannot be recognized.

[Basic Judgment 3]

This judgment is provided for the case that the distance is other than Z=Zo or Z_MAX, and is effected for both edges of the road.

(a) Left Edge of the Road

The following two types of judgments are effected.

[Judgment 3a]

Figure 7A:
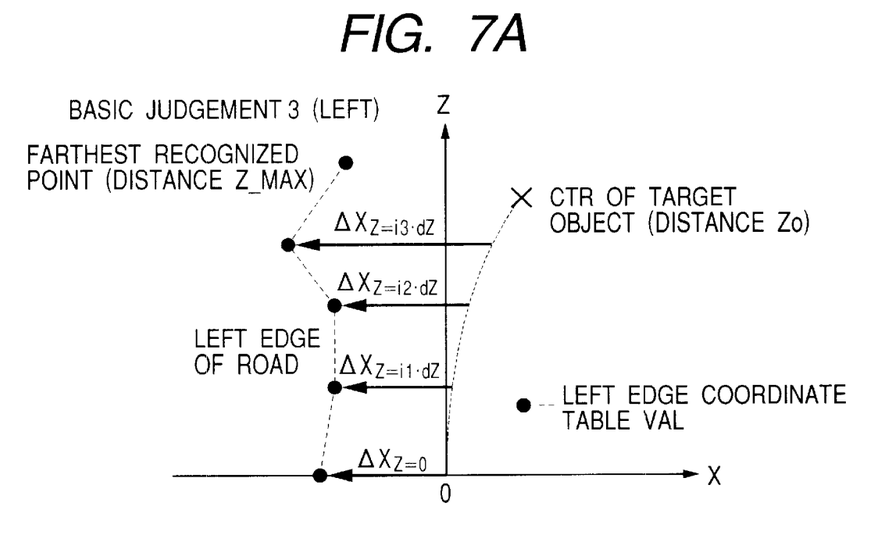
FIGS. 7A and 7B are illustrations of a road edge recognition operation according to the embodiment.

In FIG. 7A, all of positive values i's satisfying i·dZ≤Zo (dZ=5 m) are subjected to substitution Z_MAX→i·dZ, and subjected to the judgment which is the same as that effected in the case that the resultant of the basic judgment 2 (L)=1.

When all i's satisfy the condition that the basic judgment 2 (L)=1, the result of the basic judgment 3a (L)←1.

When there is one or more i's which do not satisfy the condition, the result of the basic judgment 3a (L)←−1.

When there is no i to be judged, the result of the basic judgment 3a (L)←0.

[Judgement 3b]

In FIG. 7A, all of positive values i's satisfying i·dZ≤Zo (dZ=5 m) are subjected to substitution Z_MAX→i·dZ, and subjected to the judgment which is the same as that effected in the case that the resultant of the basic judgment 2 (L)=−1.

When all i's satisfy the condition that the basic judgment 2 (L)=−1, the result of the basic judgment 3b (L)←1.

When there is one or more i's which do not satisfy the condition, the result of the basic judgment 3b (L)←−1.

When there is no i to be judged, the result of the basic judgment 3b (L)←0.

(b) Right Edge of the Road

The basic judgment 3a (R) and the basic judgment 3b (R) are calculated in the same way as judgment of the left edge of the road.

When the result of the basic judgment 3a is "1", any of road edge data provides judgment of the same lane. When the result is "−1", judgment is difficult to determine whether the object target is the preceding vehicle of the subject vehicle in accordance with the distance. When the result of the basic judgments 3a is "0", there is no road edge coordinate data at any nearer distance than the distance of the object target.

On the other hand, when the result of the basic judgment 3b is "1", it is possible to judge whether the object target exists on the other lane or is an object on the road, from road edge data at any distance. When the result is "−1", it is difficult to determine that the object target exists on the other lane or is the object on the road, in accordance with the distance. Moreover, when the result of the basic judgment 3b is "0", there is no road edge coordinate data at nearer distance than the distance of the object target.

According to the results of the three basic judgments, the compensation value for the instantaneous value of the probability of the same lane is calculated in either of the following six classes. If there is a case that a plurality of judgment conditions are satisfied, the instantaneous value having a higher priority is used.

[First Class]

This operation is effected when the road edges have been recognized and the object target can be judged to be the preceding vehicle on the same lane.

① On the left edge of the road, when the basic judgment 1 (L) result=1 and the basic judgment 3a (L)=1, the compensation value for the instantaneous probability of the same lane←−40% and the priority is 5, when the basic judgment 1 (L) result=1 and the basic judgment 3a (L)=−1, the compensation value for the instantaneous probability of the same lane←−0% and the priority is 3, and when the basic judgment 1 (L) result=1 and the basic judgment 3a (L)=0, the compensation value for the instantaneous probability of the same lane←−40% and the priority is 2.

Regarding ② on the right edge of the road, the compensation value is calculated in the same way as the left edge of the road.

[Second Class]

This operation is effected when the road edges have been recognized beyond a farthest point than the moving object and the object target can be judged to be an object on the road.

① On the left edge of the road, when the basic judgment 1 (L) result=−1 and the basic judgment 3a (L)=1, the compensation value for the instantaneous probability of the same lane←−40% and the priority is 5, when the basic judgment 1 (L) result=−1 and the basic judgment 3a (L)=−1, the compensation value for the instantaneous probability of the same lane←−0% and the priority is 3, and when the basic judgment 1 (L) result=−1 and the basic judgment 3a (L)=0, the compensation value for the instantaneous probability of the same lane←−40% and the priority is 2.

Regarding ② on the right edge of the road, the compensation value is calculated in the same way as the left edge of the road.

[Third Class]

This operation is effected when the road edges have not been recognized up to the (moving) object target and the object target can be judged to be a vehicle on the other lane or an object on the road.

① On the left edge of the road, when the basic judgment 2 (L) result=1 and the basic judgment 3a (L)=1, the compensation value for the instantaneous probability of the same lane←−40% and the priority is 1, when the basic judgment 2 (L) result=1 and the basic judgment 3a (L)=−1, the compensation value for the instantaneous probability of the same lane←−0% and the priority is 1, when the basic judgment 2 (L) result=1 and the basic judgment 3a (L)=0, and the reliability of the basic judgment 2 (L)=1, the compensation value for the instantaneous probability of the same lane←−40% and the priority is 1, and when the basic judgment 2 (L) result=1 and the basic judgment 3a (L)=0, and the reliability of the basic judgment 2 (L)=−1, and the compensation value for the instantaneous probability of the same lane←−20% and the priority is 1.

Regarding ② on the right edge of the road, the compensation value is calculated in the same way as that calculated on the left edge of the road.

[Fourth Class]

When the road edges have not been recognized up to the object target and the object target can be judged to be a vehicle on the other lane or an object on the road.

① On the left edge of the road, when the basic judgment 2 (L)=−1 and the basic judgment 3a (L)=1, the compensation value for the instantaneous probability of the same lane←−−40% and the priority is 1, when the basic judgment 2 (L)=−1 and the basic judgment 3a (L)=−1, the compensation value for the instantaneous probability of the same lane←−0% and the priority is 1, when the basic judgment 2 (L)=−1 and the basic judgment 3a (L)=0, and the reliability of the basic judgment 2 (L)=1, the compensation value for the instantaneous probability of the same lane←−−40% and the priority is 1, and when the basic judgment 2 (L)=−1 and the basic judgment 3a (L)=0, and the reliability of the basic judgment 2 (L)=−1, the compensation value for the instantaneous probability of the same lane←−−20% and the priority is 1.

Regarding ② on the right edge of the road, the compensation value is calculated in the same way as that calculated for the left edge of the road.

[Fifth Class]

When any of conditions in the above-mentioned first to fourth classifications is not satisfied because of the neither edge of road is recognized for example, the compensation value for the instantaneous probability of the same lane ←−0% and the priority is 0.

[Sixth Class]

The object target judged to be an object on the edge of the road is classified in this class.

Figure 7B:
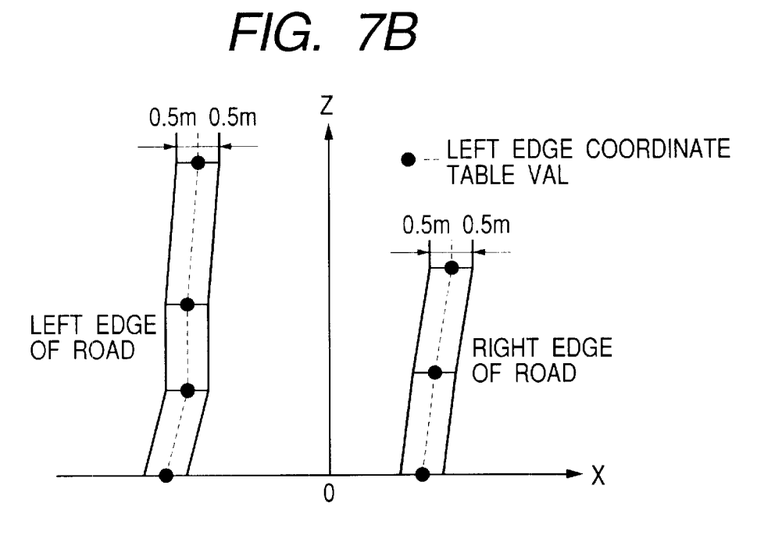

The object of which center exists on the region shown in FIG. 7B, that is, on the region from the recognized road edge (left and right), the width of the region being 0.5 m, is judged to be an object on the road, and the compensation value and the priority are set as follows:

The compensation value for the instantaneous probability of the same lane←−70% and the priority is 6.

The above-mentioned calculation of the compensation value is outlined as follows:

①  When it is difficult to correctly judge the preceding vehicle from the reason of the road shape, the compensating is not effected (fifth class). In this case, because there is possibility that compensation may decrease the accuracy, compensations is substantially not effected.

②  When the road shape has been recognized at a nearer distance than the object, the compensation value is smaller than that in the case that the road shape have been recognized at the farthest distance (the result of the basic judgment 2 is further considered). If the road shape has been recognized at the near distance, a circle arc is assumed between the object and the position of the subject vehicle for judgment. Thus, there is predictive processing. In consideration of this point, it is desirable to make the compensation value relatively small.

③  When the object is judged to be an object on the road edge, the compensation value is made large (refer to the sixth class). In this case, because the object is judged to be the object on the load edge, it may exist on the other portion than this lane, the compensation value is set to be −70%, i.e., a negative and large absolute value. Therefore, though the instantaneous probability of the same lane is high, the probability can be reduced to prevent error selection. For example, this operation is particularly effective when the subject vehicle is traveling on the straight lane and the following portion of the lane curves.

The priority is used as follows:

In this embodiment, the judgment is performed with using either edge of the road. However, the degree of recognition of the left edge may be different from that of the right edge of the road. Thus, the probability of the same lane may be different between judgment from the left edge of the road and judgment from the right edge of the road. In this case, the compensation value is calculated on the basis of the judgment result having the higher priority.

In the above-mentioned case, in the first and second classes where the road shape has been recognized at the farther than the target object, the priorities are 5, 3, and 2. On the other hand, in the third and fourth classes in which the road shape has been recognized at the nearer distance than object target, the priority is one, so that the judgment result in the first and second classes acquire the higher priority.

Moreover, the above-mentioned classifications are made by combining the result of the basic judgment 3 with that of the basic judgment 1 or 2. This provides judgments of the priority in consideration of the road shape and the positions of the objects used for recognition.

Figure 8:
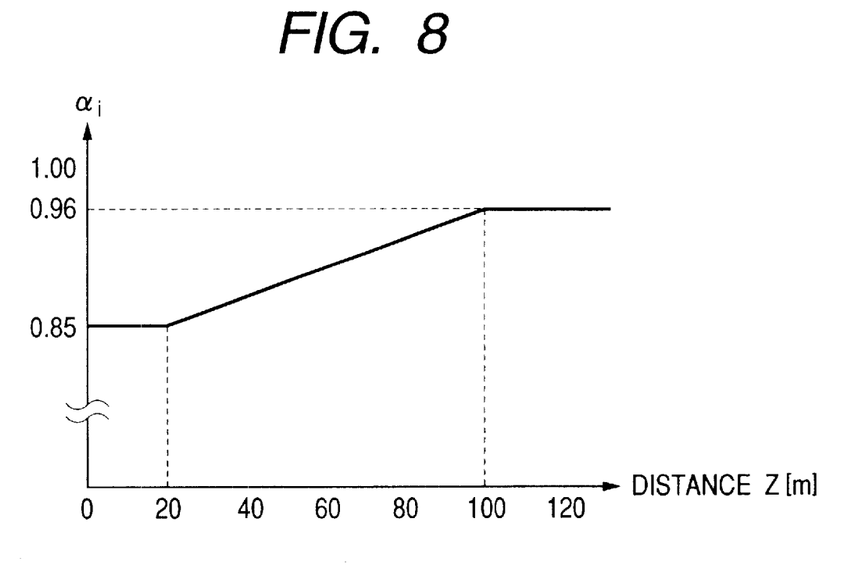
FIG. 8 is a graphical drawing showing a map of a for obtaining the-same-lane probability according to the embodiment.

Now return to FIG. 2, in step S7000, the probability of the same lane is calculated. At first, the compensation value calculated in step S6000 is added to the instantaneous probability of the same lane calculated in step S4000. In this operation, a limiting process is performed with upper limit of 100% and the lower limit 0%. Next, filtering is effected with the following equation:

probability of the same lane←previous value of the probability of the same lane×α+instantaneous probability of the same lane× (1−α)

where α is a parameter depending on the distance Z and is obtained from the map shown in FIG. 8. The initial value of the probability of the same lane is 0%.

In the following step S8000, the preceding vehicle judgment is effected. That is, the object target having the smallest distance Z is selected as the preceding vehicle out of the object targets of which the probability of the same lane calculated in step S7000 is equal to or higher than 50%. Then, the inter-vehicle distance is controlled in accordance with the distance and the relative velocity of the judged preceding vehicle. When there is possibility of collision, an alarm sound is generated.

In this embodiment, at least one of the steering sensor 27, the steering angle operation block 49, the yaw rate sensor 28 and the yaw rate operations block 51 correspond to the turning detection means. The curvature calculation block 63 corresponds to the curvature calculation means. The distance and angle measuring unit 5 corresponds to the radar means. The polar to orthogonal conversion block 41 and the object recognition block 43 correspond to the object recognition means. Moreover, the preceding vehicle judgment block 53 corresponds to the same lane probability calculation means, the preceding vehicle selection means, the-same-lane judging means, and the compensation value calculation means.

Advantage effects according to the embodiment of this invention will be described.

The selection of the preceding vehicle is effected by calculating the radius of the curvature of the lane on which the subject vehicle is traveling in accordance with the turning condition of the subject vehicle and the velocity of the subject vehicle obtained on the basis of the steering angle, and the yaw rate in step S3000 in FIG. 2. Next, the instantaneous probability of the same lane that is the probability that the recognized object target exists on the same lane in step S4000. In this operation, the instantaneous probability is compensated. That is, the road shape is recognized with delineator or the like in step S5000. The instantaneous probability of the same lane is compensated on the basis of the recognized road shape in step S6000. Next, the probability of the same lane is calculated after a predetermined filtering process with the compensated instantaneous probability of the same lane in step S7000. The preceding vehicle is selected on the basis of the probability of the same lane in step S8000.

As mentioned above, the curve is basically predicted in accordance with the data of the steering angle obtained from the steering sensor 27 to maintain the minimum accuracy in the-same-lane probability. Then, if reflective objects such as delineators can be detected, the recognized road shape is compensated on the basis of the detected reflective object to improve the accuracy of selecting the preceding vehicle.

Moreover, in compensation, the compensation value is generated in accordance with the degree of recognizing the road shape and the priority in judgment is varied in accordance with the degree of the recognition of the road shape, so that the favorable compensating is provided for the preceding vehicle selection at a high accuracy.

This invention is not limited to the scope of the above-mentioned embodiment, and may be effected in various modification.

(1) For example, in the above-mentioned embodiment, judgment is performed with reference to the both edges of the road and when the judgment results are different from each other, the judgment having the higher priority is used. However, judgment referring only either edge may be possible. However, it is not always that both edges of the road can be recognized stably. Thus, it is better that the shape of both edges of the road is directly recognized.

(2) In the above-mentioned embodiment, compensation values and the priority values are concretely described. However, they are only examples and can be modified.

(3) In the above-mentioned embodiment, the distance and angle measuring unit 5 using the laser beam is used as the radar means. Moreover, it have been mentioned that the radar using a millimeter band is also applicable. In the case of using a millimeter band, if an FMCW radar or a Doppler radar is used, the distance data and the relative velocity data to the preceding vehicle are obtained at the same time. Thus, calculation of the relative velocity on the basis of the distance data is unnecessary.

What is claimed is:

1. A method of selecting one of recognized objects as a preceding vehicle of a subject vehicle, comprising the steps of:

recognizing said objects in front of said subject vehicle;

obtaining relative positions and relative velocities of said recognized objects;

classifying said objects into stationary objects and moving objects on the basis of relative velocities of said objects to said subject vehicle;

calculating a curvature of the lane on which said subject vehicle is traveling, on the basis of a turning condition and the velocity of said subject vehicle;

calculating a probability that each of said moving objects travels on the same lane as said subject vehicle on the basis of said curvature and said relative position of each of said moving objects;

recognizing a shape of the road, including the lane, in front of said subject vehicle, on the basis of distances to said stationary objects and angles of said stationary objects in the width direction of said subject vehicle and detecting a degree of recognizing said shape on the basis of said relative positions of said stationary objects and each of said moving objects;

detecting a possibility that each of said moving objects exists on the same lane as said subject vehicle on the basis of the recognized shape of the road and said degree;

calculating a compensation value for compensating said probability on the basis of the detected possibility;

compensating said probability with said compensation value; and selecting one of said moving objects as the preceding vehicle on the basses of the compensated probability.

2. A preceding vehicle selecting apparatus for a vehicle comprising:

turning detection means for detecting a turning condition of a subject vehicle;

curvature calculation means for calculating a curvature of the lane on which said subject vehicle is traveling, on the basis of the detected turning condition and a velocity of said vehicle;

radar means for emitting a transmission signal within a predetermined angle range, in front of said vehicle, extending in a width direction of said vehicle and detecting distances to objects reflecting said transmission signal and angles of said object in said width direction of on the basis of the reflected transmission signal;

object recognizing means for obtaining relative positions and relative velocities of said objects to said vehicle on the basis of the distances and the angles in said width direction from said radar means and classifying said objects into stationary objects and moving objects on the basis of said relative velocities;

the-same-lane probability calculation means for calculating a probability that each of said moving objects exists on the same lane as said subject vehicle, on the basis of the curvature from said curvature calculation means and the relative position of each of said moving objects from said object recognition means;

road shape recognition means for extracting a part of said stationary objects which are effective for recognizing a shape of said road on the basis of said relative positions of said stationary objects, recognizing a shape of said road in front of said subject vehicle on the basis of said relative positions of said extracted stationary objects, and detecting a degree that said shape has been recognized in accordance with said relative positions of said stationary objects and each of said moving objects;

the-same-lane judging means for judging the possibility that each of said moving objects exists on the same lane as said vehicle on the basis of said recognized road shape and said degree;

compensation value calculation means for calculating a compensation value for compensating said probability of each of said moving objects on the basis of the judging result by said the-same-lane judging means;

compensation means for compensating said probability from said the-same-lane probability calculation means with said compensation value for each of said moving objects; and preceding vehicle selection means for selecting the preceding vehicle of said vehicle from said moving objects on the basis of probabilities from said compensation means.

3. A preceding vehicle selection apparatus as claimed in claim 2, wherein said the-same-lane judging means further judges whether said degree is such that said the-same-lane judging means will incorrectly judge the possibility in accordance with the recognized shape of said road, and when said the-same-lane judging means judges that said degree is such that said the-same-lane judging means will incorrectly judge the possibility, said compensation value calculation means makes said compensation value zero.

4. A preceding vehicle selection apparatus as claimed in claim 2, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said compensation value calculation means makes the absolute value of said compensation value for each of said moving objects relatively small.

5. A preceding vehicle selection apparatus as claimed in claim 2, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said compensation value calculation means makes the absolute value of said compensation value for said one of said moving objects relatively small in accordance with a relative distance of said recognized shape determined with relative positions of said part of said stationary objects.

6. A preceding vehicle selection apparatus as claimed in claim 2, wherein said the-same-lane judging means further judges whether each of said moving object exists around one of edge of said road, and when said the-same-lane judging means judges that each of said moving object exists around one of edge of said road, said compensation value calculation means makes said compensation value relatively large in the negative direction.

7. A preceding vehicle selection apparatus as claimed in claim 2, wherein said the-same-lane judging means judges the possibility that each of said moving objects exists on the same lane with reference to relations of said relative position of each of said moving objects and relative positions of said part of stationary objects.

8. A preceding vehicle selection apparatus as claimed in 2, wherein said road shape reorganization means recognizes edges of said road, and said the-same-lane judging means judges the possibility that each of said moving objects exists on the same lane as said vehicle on the basis of each of said recognized edges and said degree, and judges a priority of said possibility on the basis of said degree every said recognized edge, and said compensation value calculation means calculates a compensation value for compensating said probability of each of said moving objects on the basis of the judging result of said the-same-lane judging means of which said priority judged for one of said recognized edges is higher than that for the other of said recognized edges.

9. A preceding vehicle selection apparatus as claimed in claim 8, wherein said the-same-lane judging means further judges whether said degree is such that said shape of said road is recognized only at the range nearer than each of said moving objects, and when said the-same-lane judging means judges that said degree is such that said shape of said road is recognized only at the range nearer than each of said moving objects, said the-same-lane judging means judges said priority of said possibility to be relative low priority.

10. A preceding vehicle selection apparatus as claimed in claim 8, wherein said the-same-lane judging means further judges whether each of said moving object exists around one of edge of said road, and when said the-same-lane judging means judges that each of said moving object exists around one of edges of said road, said the-same-lane judging means judges said priority to be relatively high.

11. A preceding vehicle selection apparatus as claimed in claim 10, wherein said the-same-lane judging means judges the priority that each of said moving objects exists on the same lane with reference to relations of said relative position of each of said moving objects and relative positions of said part of stationary objects.

12. A preceding vehicle selection apparatus as claimed in claim 2, wherein the-same-lane judging means detects a relative velocity vector of said part of stationary objects which are effective for recognizing a shape of said road, obtains a circle of which a tangent line vector corresponds to said relative velocity vector, and judges the possibility on the basis of said circle.

13. A preceding vehicle selection apparatus as claimed in claim 2, further comprising an alarm generating unit for generating an alarm when one of said objects exists within a predetermined distance.

14. A preceding vehicle selection apparatus as claimed in claim 13, wherein said one of said objects is said preceding vehicle or one of said stationary objects.

15. A recoding medium readable by a computer for recording programs for a preceding vehicle selection apparatus for a vehicle comprising:
   turning detection means for detecting a turning condition of a subject vehicle;
   curvature calculation means for calculating a curvature of the lane on which said subject vehicle is traveling, on the basis of the detected turning condition and a velocity of said vehicle;
   radar means for emitting a transmission signal within a predetermined angle range, in front of said vehicle, extending in a width direction of said vehicle and detecting distances to objects reflecting said transmission signal and angles of said object in said width direction of on the basis of the reflected transmission signal;
   object recognizing means for obtaining relative positions and relative velocities of said objects to said vehicle on the basis of the distances and the angles in said width direction from said radar means and classifying said objects into stationary objects and moving objects on the basis of said relative velocities;
   the-same-lane probability calculation means for calculating a probability of existence of each of said moving objects on the same lane as said subject vehicle on the basis of the curvature from said curvature calculation means and the relative positions of each of said moving objects from said object recognition means;
   road shape recognition means for extracting a part of said stationary objects which are effective for recognizing a shape of said road on the basis of said relative positions of said stationary objects, recognizing a shape of said road on the basis of said relative positions of said extracted stationary objects, and detecting a degree that said shape has been recognized, in accordance with said relative positions of said stationary objects and each of said moving objects;
   the-same-lane judging means for judging the possibility that each of said moving objects exists on the same lane as said vehicle on the basis of said recognized road shape and said degree;
   compensation value calculation means for calculating a compensation value for compensating said the-same-lane probability of each of said moving objects on the basis of the judging result by said the-same-lane judging means;
   compensation means for compensating said the-same-lane probability from said the-same-lane probability calculation means with said compensation value for each of said moving objects from said compensation value calculation means; and
   preceding vehicle selection means for selecting the preceding vehicle of said vehicle from said moving objects on the basis of the-same-lane probabilities from said compensation means.

16. A preceding vehicle selecting apparatus for a vehicle comprising:
   a yaw rate sensor for detecting a turning condition of a vehicle;
   a curvature calculation device for calculating a curvature of a lane on which said vehicle is traveling based upon said detected turning condition and a velocity of said vehicle;
   a radar detection device for emitting a transmission signal within a predetermined angle in front of said vehicle and extending in a width direction of said vehicle, for detecting distances to objects reflecting said transmission signal and for detecting angles of said objects in said width direction based upon said reflected transmission signal;
   an object recognition device for classifying said objects into stationary objects and moving objects based upon their respective velocities;
   a probability calculation device for calculating a probability that a predetermined number of said moving objects exists in a same lane as said vehicle based upon said curvature calculated by said curvature calculation device;

a road shape recognizing device for extracting stationary objects which are effective for recognizing a shape of said road based upon relative positions of said extracted stationary objects, for recognizing a shape of said road in front of said vehicle based upon said relative positions of said extracted stationary objects and for detecting a degree that said shape has been recognized in accordance with said relative positions of said extracted stationary objects and each of said moving objects;

a lane judging device for judging whether said predetermined number of said moving objects exists in said same lane as said vehicle based upon said recognized road shape and said degree;

a preceding vehicle selection device for selecting a preceding vehicle from said moving objects based upon said calculated probability.

17. A preceding vehicle selection apparatus as claimed in claim 16, further comprising:

a compensation calculation device for calculating a compensation value for each of said predetermined number of said moving objects judged to exist in said same lane as said vehicle; and a compensation device for compensating said probability with said compensation value for each of said predetermined number of said moving objects, wherein said preceding vehicle selection device is further for selecting said preceding vehicle from said moving objects based upon said compensation values and said calculated probability.

* * * * *